United States Patent [19]

Fujimori et al.

[11] Patent Number: 4,564,232
[45] Date of Patent: Jan. 14, 1986

[54] AUTOMOBILE DOOR

[75] Inventors: Yoshitsugu Fujimori, Saitama; Ryouhei Adachi, Tokyo; Hiroo Ebisawa, Saitama; Yukio Kurachi, Saitama; Masami Koike, Saitama, all of Japan

[73] Assignee: Honda Giken Kogyo Kabushiki Kaisha, Tokyo, Japan

[21] Appl. No.: 585,986

[22] Filed: Mar. 5, 1984

[30] Foreign Application Priority Data

Mar. 4, 1983 [JP] Japan ................... 58-35627

[51] Int. Cl.⁴ ............................................. B62D 27/00
[52] U.S. Cl. .................................. 296/146; 296/31 P; 296/191; 403/30; 403/14; 29/526 R
[58] Field of Search ............... 296/146, 31 P, 31 R, 296/1 R, 199, 191; 280/153 B; 403/30, 29, 28, 14, 13; 29/408–526 R

[56] References Cited

U.S. PATENT DOCUMENTS 3,875,661  4/1975  Lidstrom et al. ............... 296/31 P
4,115,974  9/1978  Purcell ........................... 296/1 R
4,153,290  5/1979  Barenyi et al. ................. 296/191

Primary Examiner—Robert R. Song
Attorney, Agent, or Firm—Lyon & Lyon

[57] ABSTRACT

An automobile door with an inner plate and an outer plate wherein the outer plate has a panel formed from a synthetic resin. The panel is attached to a rigid metallic plate, such as steel, through a plurality of fastening holes formed in the longitudinal direction of the synthetic panel. One of the fastening holes near the forward end of the panel has a diameter substantially that of the fastening means. The remaining fastening holes are formed so as to allow longitudinal expansion and contraction of the synthetic panel. A lip portion is formed near the lower edge of the synthetic panel to engage with the inner plate of the door.

4 Claims, 3 Drawing Figures

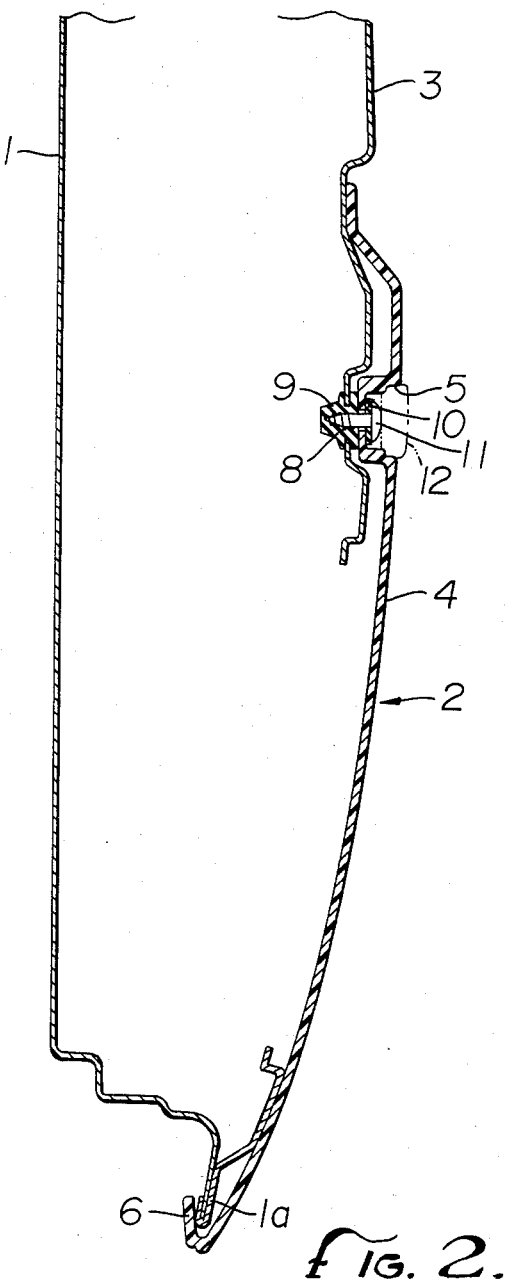

AUTOMOBILE DOOR

The present invention relates to an automobile door and more particularly to an improvement in an automobile door which has an upper piece made from steel and a lower piece made from a synthetic resin.

The use of a synthetic resin for producing the outer surface of an automobile door provides numerous advantages. The synthetic resin provides great design flexibility, substantial weight savings, and significant anti-corrosive benefits. A major draw back of such synthetic resins has been the higher thermal expansion and contraction of the synthetic material when compared to steel plates, especially in the longitudinal direction. This disparity in thermal expansion and contraction may result in deformation of the synthetic resin panel.

The present invention contemplates the use of an automobile door with a lower panel formed from a synthetic resin. The lower panel has a lip formed on its lower edge which is engaged with an inner portion of the automotive body. The upper portion of the lower panel is connected to a steel plate through a series of holes formed in the automobile longitudinal direction by fastening means. The holes include a reference hole formed near the front portion of the lower panel and a series of longitudinally extended holes to accommodate the thermal expansion.

Therefore it is an object of the present invention to provide an automobile door having a synthetic resin panel which may accommodate thermal expansion in the longitudinal direction. Other and more detailed objects of the invention shall become apparent from examination of the description and drawings contained herein, wherein:

FIG. 2 is a cross sectional view of an automobile door taken substantially along line II—II of FIG. 1.

Figure 1:
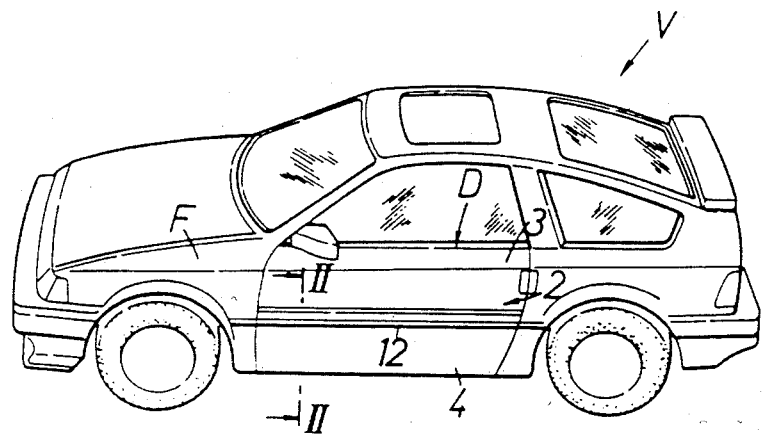
FIG. 1 is a perspective view of an automobile including the invention.

As shown in FIGS. 1 and 2, an automobile V has its door D constructed of an inner plate 1 and outer plate 2. The inner plate 1 is made from a rigid metal, such as steel. The outer plate 2 has an upper panel 3, made from a rigid metallic material such as steel, and a lower panel 4 made of a synthetic resin.

The synthetic resin panel 4 is injection-molded of a thermo-plastic synthetic resin with a high shock strength, for example, a polycarbonate resin, a polycarbonate alloy resin, or a polycarbonate ABS resin. The synthetic resin panel is formed with a square groove 5 having an internal shoulder in the longitudinal direction of the automobile. The lower edge of the synthetic resin panel 4 has a lip portion 6 also formed in the longitudinal direction of the automobile.

Figure 3:
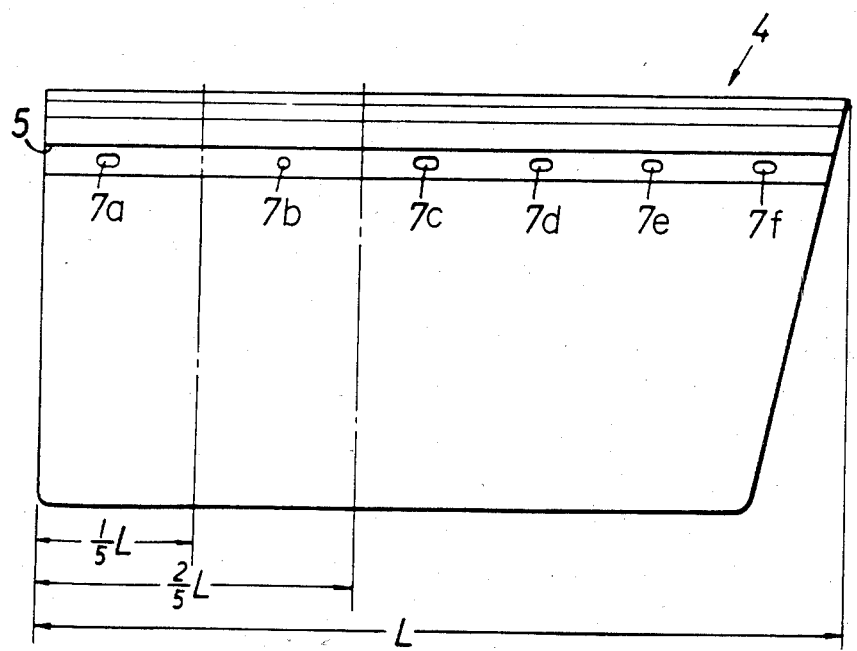
FIG. 3 is a side elevation showing the synthetic resin panel and its mounting holes.

As shown in FIG. 3, the bottom of the groove 5 has a plurality of fastening holes 7a–7f including a reference hole 7b formed therethrough along the longitudinal direction of the automobile. The fastening holes 7a–7f are spaced along the longitudinal axis at predetermined intervals therebetween. The reference hole 7b is formed through the lower panel 4 in a predetermined area from the edge of the panel 4 which is adjacent the front fender F. If, as shown in FIG. 3, the longitudinal length of the lower panel 4 is designated L, the reference hole 7b is positioned within a range of one-fifth L to two-fifths L from the edge of the lower panel 4 which is adjacent the fender F.

Fastening means 11 are used to secure the lower panel 4 to the upper panel 3. The diameter of the reference hole 7b is substantially equal to the external diameter of the fastening means 11. The remaining fastening holes 7a and 7c–7f are formed as slots, extending in the longitudinal direction, so as to accommodate differring thermal expansion or contraction of the lower panel 4 relative to the upper panel 3 in the longitudinal direction.

The upper panel 3 which is made of a rigid metallic material, such as steel, has holes 8 formed therethrough corresponding to the fastening holes 7a–7f of the lower panel 4. Threaded grommets 9 and rubber washers 10 are fitted in each hole 8 to engage the fastening means 11.

The lip portion 6 formed in the lower edge of the lower panel 4 is engaged with the lower edge 1a of the inner plate 1. The lip portion 6 has a cross section which is substantially that of an inverted U. The fastening means 11 are shown in the preferred embodiment as small screws acting to connect the lower panel 4 to the upper panel 3 of the outer plate 2 by engaging the threaded grommets 9 through the rubber washers 10. A colored molding 12 is used to enclose the groove 5 in the lower panel 4.

As described herein, the lower panel 4 made from a synthetic resin is secured to the rigid upper panel 3 in such a way that longitudinal movement of the lower panel 4 is restricted by the fastening means 11 through the reference fastening hole 7b. The remaining fastening holes 7a and 7c–7f are formed so as to allow longitudinal expansion and contraction of the lower panel 4 relative to the upper panel 3. The engagement of the lower lip portion 6 of the lower panel 4 with the inner plate 1a acts to maintain the lower panel 4 in its selected position. Since the lower panel 4 is secured to the upper panel 3 through the reference hole 7b which is placed near the front edge of the lower panel 4, the degree of longitudinal shrinkage and expansion towards the front fender F is minimized. As a result, a minimum gap between the lower panel 4 and the front fender F is maintained to insure that the door can be smoothly opened and closed at all times.

While described herein in connection with a lower panel on a automobile door, it is anticipated that the invention may be used in alternative embodiments such that the description contained herein should not be construed so as to limit the scope of the appended claims.

We claim:

1. An automobile door with an inner plate and an outer plate including an upper panel and lower panel with different thermal expansion characteristics, comprising, a plurality of holes including a reference hole formed along the longitudinal axis of the automobile through the upper and lower panels of the outer plate along the lower edge portion of the upper panel and along the upper edge portion of the lower panel, fastening means fitted through said holes attaching the lower panel to the upper panel, said reference hole being approximately equal in size to the outer diameter of one of said fastening means, the other said holes being formed so as to allow different amounts of longitudinal expansion between the upper and lower panels, and a lip formed on the lower edge of the lower panel engaged with the lower edge of the inner plate.

2. An automobile door with an inner plate and an outer portion, the outer portion having a upper panel formed of steel and a lower panel formed from a synthetic resin, comprising, a lip formed on the lower edge of the lower panel, said lip engaging the lower edge of the inner plate, a plurality of holes correspondingly formed through the upper and lower panels along the lower edge portion of the upper panel and along the upper edge portion of the lower panel, said holes allowing for longitudinal expansion of said lower panel, and a plurality of fastening means extending through said holes to attach the upper and lower panels.

3. An automobile door as set forth in claim 2 wherein said lower panel holes includes a reference hole near the forward edge of the lower panel, said reference hole having a diameter substantially that of said fastening means, said remaining holes being slots extending substantially in the longitudinal direction of said lower panel.

4. The automobile door as set forth in claim 3 wherein said reference hole is spaced from the forward edge of the lower panel between one-fifth and two-fifths of the longitudinal length of the lower panel.

* * * * *